(12) United States Patent
Lau et al.

(10) Patent No.: US 7,502,778 B2
(45) Date of Patent: Mar. 10, 2009

(54) APPARATUS, SYSTEM, AND METHOD FOR EFFICIENT ADAPTIVE PARALLEL DATA CLUSTERING FOR LOADING DATA INTO A TABLE

(75) Inventors: Leo Tat Man Lau, Richmond Hill (CA); Mark Donald Leitch, Ajax (CA); Marko Milek, Toronto (CA); David Sciaraffa, Markham (CA); Qing Song, Markham (CA)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 11/614,834

(22) Filed: Dec. 21, 2006

(65) Prior Publication Data

US 2008/0154934 A1     Jun. 26, 2008

(51) Int. Cl.
*G06F 17/30* (2006.01)
(52) U.S. Cl. .............................. 707/2; 711/133; 707/3
(58) Field of Classification Search .................... 707/2, 707/3; 711/133
See application file for complete search history.

(56) References Cited

U.S. PATENT DOCUMENTS 7,080,206 B2    7/2006  Berks et al. .................. 711/133

FOREIGN PATENT DOCUMENTS

CA    2415018AA    6/2004

*Primary Examiner*—Hosain T Alam
*Assistant Examiner*—Syling Yen
(74) *Attorney, Agent, or Firm*—Kunzler & McKenzie

(57) ABSTRACT

An apparatus, system, and method are disclosed for efficient adaptive parallel data clustering for loading data into a table by generating a hint-key for each of one or more records in the input data stream, ordering the one or more records in a first-level clustering agent to generate one or more record lists ordered by hint-key. The apparatus, system, and method simultaneously processes one or more record lists in a second-level clustering agent, outputs the one or more records of the one or more record lists clustered by the hint-key of the one or more records, stores, in a partial block cache, a plurality of partial blocks that are output by the second-level clustering agent, and stores, in a partial page cache, a plurality of last partial pages of the partial blocks that have been victimized from the partial block cache.

3 Claims, 4 Drawing Sheets

APPARATUS, SYSTEM, AND METHOD FOR EFFICIENT ADAPTIVE PARALLEL DATA CLUSTERING FOR LOADING DATA INTO A TABLE

BACKGROUND OF THE INVENTION

1. Field of the Invention

The present invention relates to the field of database systems, and more particularly to a system and associated method for efficient adaptive clustering of parallel data when loading a data structure containing data that is clustered along one or more dimensions, such as a multi-dimensional clustering (MDC) table.

2. Description of the Related Art

Aspects of loading data into a table using data clustering are discussed in U.S. Pat. No. 7,080,206, which is incorporated herein by reference.

In database terminology, a multi-dimensional clustering (MDC) table is a table in which data is logically clustered (and sometimes also physically clustered) on disk according to a specified key referred to as the "dimension key." Each distinct value in the domain of key values represents a "cell" of the MDC table. On disk, each cell comprises one or more fixed size "blocks," where each block may only contain data for one cell. It is not necessary for all blocks associated with a cell to be contiguously stored on disk.

For example, consider an MDC table SALES having the following definition: SALES (INT STORE_ID, INT CUST_ID, DATE SALE_DATE, INT SALE_MONTH GENERATED ALWAYS AS MONTH(D)) DIMENSIONS(STORE_ID, SALE_MONTH)

The DIMENSIONS clause of the SALES table defines the dimension key that indicates how the data is to be clustered on disk. In this example, data for the SALES table is to be clustered by STORE_ID and SALE_MONTH. The physical blocks on disk for this table may appear as follows: block1 (contains data for cell (1, 1), i.e., STORE_ID "1" and month "1"): 1, 20, 2002/01/01, 11, 21, 2002/01/03, 11, 21, 2002/01/04, 11, 22, 2002/01/05, 1: block2 (contains data for cell (2, 1), i.e., STORE_ID "2" and month "1"): 2, 43, 2002/01/01, 12, 10, 2002/01/02, 12, 52, 2002/01/15, 1: block3 (contains more data for cell (1, 1), i.e., STORE_ID "1" and month "1"): 1, 25, 2002/01/15, 11, 31, 2002/01/15, 11, 32, 2002/01/15, 11, 45, 2002/01/16, 11, 12, 2002/01/16, 1:

Each comma-delimited line above denotes a single row, groups of which may form fixed-size pages (e.g., sub-blocks or other sub-divisions) within fixed-size blocks.

Table partitioning is a data organization scheme in which table data is divided across multiple storage objects called data partitions or ranges according to values in one or more table columns. Each data partition is stored separately. These storage objects can be in different table spaces, in the same table space, or a combination of both.

Table data may be partitioned as specified in the PARTITION BY clause of the CREATE TABLE statement. The columns used in this definition are referred to as the table partitioning key columns.

For example, the following creates a table customer where rows with l_shipdate>='01/01/2006' and l_shipdate<='03/31/2006' are stored in table space ts1, rows with l_shipdate>='04/01/2006' and l_shipdate<='06/30/2006' are in table space ts2, etc.

CREATE TABLE customer (l_shipdate, l_name CHAR (30))
IN ts1, ts2, ts3, ts4, ts5
PARTITION BY RANGE(l_shipdate) (STARTING FROM ('01/01/2006')
ENDING AT ('12/31/2006') EVERY (3 MONTHS))

A challenge that arises when large quantities of data are bulk-loaded into an MDC or partitioned table is ensuring favorable input/output characteristics (i.e. minimizing read/write operations to disk as much as possible) in the face of an unknown distribution of input data. The term "unknown distribution" as used herein refers to the absence of any prior knowledge by the input data loading algorithm of the degree to which the input data is already clustered with respect to an operative dimension key.

At least two approaches to loading data into an MDC table are known. These are referred to as "Algorithm 1" and "Algorithm 1_".

The steps of Algorithm 1 may be summarized as follows: 1. Read all input data rows (i.e. records) from disk. As each row is read, perform an in-memory "bucket sort" of the row according to its dimension key. Whenever a block is filled, write it to disk. 2. When all rows have been processed, write to disk any partially filled blocks that are still in memory.

Algorithm 1 exhibits optimum input/output (I/O) characteristics regardless of input data distribution because no blocks are written to disk prematurely during loading, thus no blocks need to be read back from and re-written to disk in order to be updated. If input data is well clustered, the amount of memory needed by Algorithm 1 will be minimal, since blocks in memory will be repeatedly filled and written to disk (thus vacating memory for re-use), with few incomplete blocks residing in memory at any given time during loading.

As input cell data becomes more and more randomly distributed throughout the input data, however, Algorithm 1 requires more and more memory to maintain its optimum IO characteristics. In the worst case, if N cells are represented in the input data, N* blocks of memory are required. If N is large, the amount of memory required may be infeasible for practical implementation.

Algorithm 1_ modifies the approach of Algorithm 1 slightly to accommodate a memory constraint. When a predetermined upper limit of memory is reached and space for a new block is needed, Algorithm 1_ chooses a partially filled block in memory (perhaps based on age) and writes, or spills, the partially filled block to disk. An example of an arbitrary buffer replacement strategy is "last recently used" approach known in the art. In this approach, when data is perfectly clustered, only one block-size chunk of memory is required to store a block that is repeatedly filled and written to disk.

When data is well clustered but not perfectly clustered, the likelihood of further input data rows having the dimension key of a partially filled block that is spilled to disk is low, although not zero. It is therefore improbable that a partially filled block that has been spilled to disk will ever require updating in the future, and near-optimum I/O characteristics may be achieved.

An alternative approach to the two algorithms described above involves sorting all the input data according to the dimension key prior to loading. Sorting the data will result in the data being perfectly clustered according to the dimension key. When data is randomly distributed in the input file, sorting is likely (on average) to produce the best I/O characteristics possible.

However, there are at least two drawbacks to pre-sorting the data. First, when the input data is already well clustered, sorting may constitute a significant waste of processing. Second, sorting may not only cluster the data according to the dimension key but may also order all blocks according to the dimension key. Since blocks associated with a cell do not need to be stored contiguously on disk, such extra processing constitutes an unnecessary waste of resources.

Additionally, there are at least two more drawbacks when using sorting to cluster the data. In most cases, sorting requires additional I/O. Unless the entire input can be fit into main memory, there will be a need to spill partially sorted runs and read them back in during a merge phase (this is an additional performance penalty). In addition, the sorting approach doesn't parallelize easily. One has to wait for the sort to process the entire input before the actual loading process can start. Consequently, this limits the ability to pipeline the operations.

One approach to these problems is described in U.S. Pat. No. 7,080,206, in which a system for adaptively loading input data into a multi-dimensional clustering table is disclosed. In this approach, first-level clustering agents cluster data into lists of rows. The lists generated by the first level clustering agents are clustered.

Data generated by the first level clustering agents is passed to a second-level clustering agent for processing. The second-level clustering agent processes the lists from each first-level clustering agent sequentially, attempting to cluster the data into blocks that can be written to secondary storage. The data being clustered is stored in cache as more data is processed. As the cache memory fills, it is victimized, with the contents of the cache written to disk. When additional data matching the clustering characteristics of previously victimized data, the previously victimized data is retrieved from disk and the clustering in the second-level clustering agent continues.

While the method described in U.S. Pat. No. 7,080,206 does cluster input data for loading into a table, large data streams with like cell values distributed diffusely within the data file are processed inefficiently. Repeated victimization and retrieval from disk by the second-level clustering agent results in a bottleneck in the input/output system that slows the load process.

SUMMARY OF THE INVENTION

From the foregoing discussion, it should be apparent that a need exists for an apparatus, system, and method that efficiently load data into clusters. Beneficially, such an apparatus, system, and method would improve the performance of database loading.

The present invention has been developed in response to the present state of the art, and in particular, in response to the problems and needs in the art that have not yet been fully solved by currently available bulk loaders. Accordingly, the present invention has been developed to provide an apparatus, system, and method for efficient adaptive parallel data clustering for loading data into a table that overcome many or all of the above-discussed shortcomings in the art.

A computer program product is provided comprising a computer readable medium having computer usable program code programmed for loading an input data stream into a data structure containing data that is clustered along one or more dimensions. The operations of the computer program product include generating a hint-key for each of one or more records in the input data stream, wherein the hint-key is a hash value generated using a cell value of each of the one or more records, the cell value comprising a dimension by which the records are to be clustered.

In addition, the computer program product is programmed for ordering the one or more records in a first-level clustering agent to generate one or more record lists ordered by the hint-key of the one or more records and processing one or more record lists in a second-level clustering agent. The second level-clustering agent, in one embodiment, is configured to process one or more record lists simultaneously and output the one or more records of the one or more record lists ordered by the hint-key of the one or more records. The computer program product may also be programmed for storing, in a partial block cache, a plurality of partial blocks that are output by the second-level clustering agent, wherein each partial block is associated with a distinct logical cell, and for storing, in a partial page cache, a plurality of last partial pages of the partial blocks that have been victimized from the partial block cache.

In a further embodiment, processing one or more record lists in a second-level clustering agent in the computer program product includes polling the first record of each of the one or more record lists, selecting the polled first record with the smallest hint-key, removing the selected first record and each record with an equivalent hint-key clustered with the selected first record on the same record list, and adding the removed records to a return list. Processing one or more record lists in a second-level clustering agent may also include polling the first record of each of the one or more record lists, comparing the hint-key of the polled first records to the hint-key of the removed records, and processing the return list in response to no polled first records having an equivalent hint-key to the hint-key of the removed records, processing the return list comprising outputting a plurality of partial blocks to the partial block cache.

Additionally, processing one or more record lists in a second-level clustering agent may comprise comparing a cell-key of a polled first record to a cell-key of the removed records in response to the hint-key of the polled first record being equivalent to the hint-key of the removed records, selecting the polled first record in response to the cell-key of the polled first record being equivalent to the cell-key of the removed records, removing the selected first record and each record with an equivalent hint-key clustered with the selected first record on the same record list, and adding the removed records to the return list.

A system of the present invention for loading an input data stream into a data structure containing data that is clustered along one or more dimensions is also provided. The system, in one embodiment, includes one or more microprocessors, volatile memory, non-volatile memory; and a database management system (DBMS).

The DBMS may comprise a hint-key module configured to generate a hint-key for each of one or more records in the input data stream, wherein the hint-key is a hash value generated using a cell value of each of the one or more records, the cell value comprising a dimension by which the records are to be clustered, a first-level clustering agent module configured to order the one or more records to generate one or more record lists ordered by the hint-key of the one or more records, and a second-level clustering agent module configured to process one or more record lists. The second-level clustering agent module may be configured to process one or more record lists simultaneously and output the one or more records of the one or more record lists ordered by the hint-key of the one or more records.

The DBMS may further include a partial block cache module configured to store a plurality of partial blocks that are output by the second-level clustering agent, wherein each partial block is associated with a distinct logical cell and a partial page cache module configured to store a plurality of last partial pages of the partial blocks that have been victimized from the partial block cache.

In another embodiment, the DBMS includes a cache controller module configured to dynamically enable the partial block cache module and the partial page cache module in response to a determination that the input data stream is not ordered, and dynamically disable the partial block cache module and the partial page cache module in response to an input/output ratio being below a predefined value; the input/output ratio comprising a calculated value measuring the performance benefit attributed to the partial block cache module and the partial page cache module. In an alternate embodiment, the DBMS includes a memory controller module configured to determine a state of a delivery mechanism used to deliver the record lists to the second-level clustering agent module, increase the memory allocated to the first-level clustering agent module for the storage of record lists in response to the state of the delivery mechanism indicating a surplus of record lists, and decrease the memory allocated to the first-level clustering agent module for the storage of record lists in response to the state of the delivery mechanism indicating a shortage of record lists.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
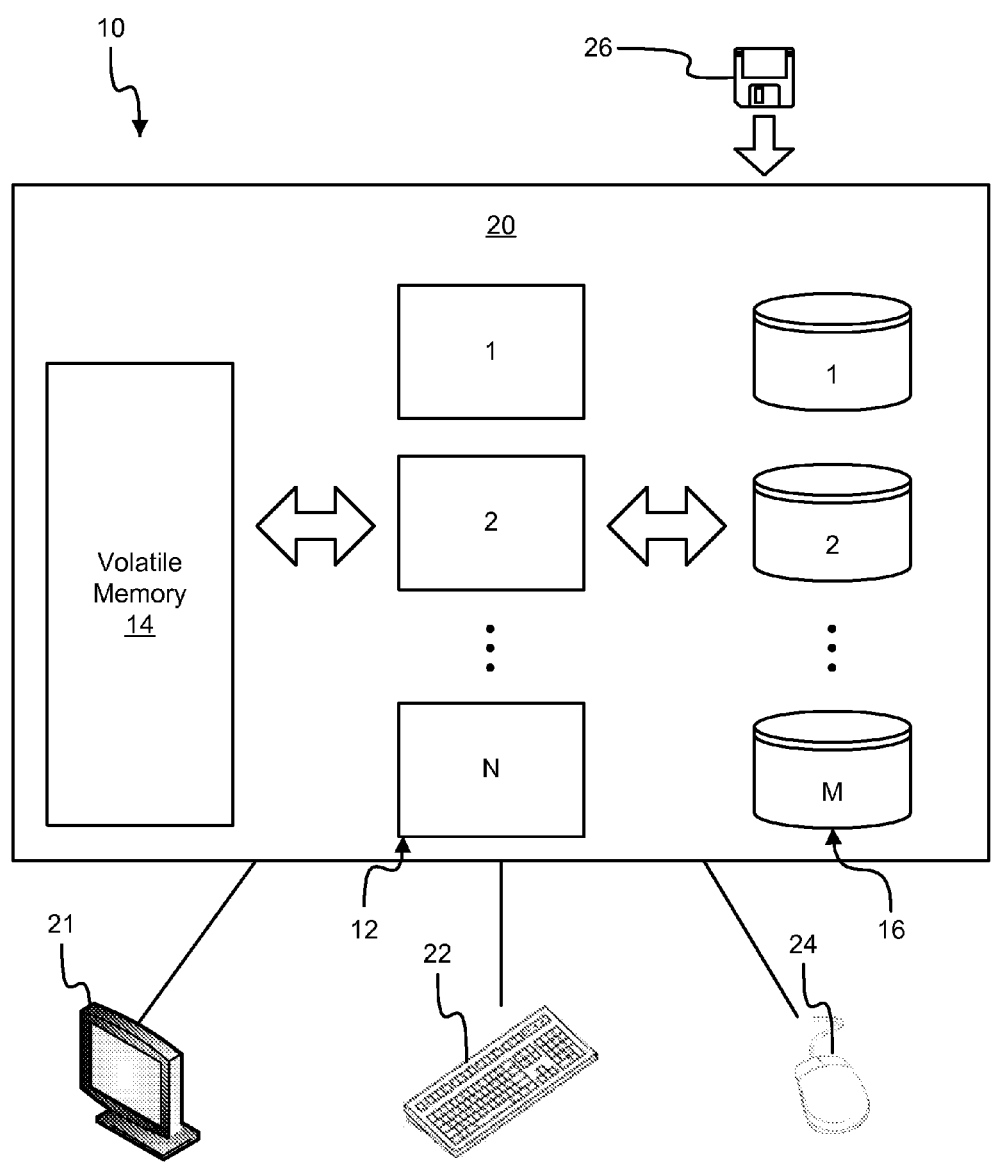
FIG. 1 is a schematic block diagram illustrating one embodiment of an exemplary operating environment in which an efficient adaptive parallel data clustering system of the present invention can be used.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 portrays an exemplary overall environment in which a database system 10 and associated method for efficient adaptive parallel data clustering when loading a data structure containing clustered data according to the present invention may be used. The database system 10 is a symmetric multiprocessor (SMP) computing device 20 having N processors 12 (where N is an integer). Each of the N processors 12 is in communication with volatile memory 14 as well as non-volatile memory 16 (also referred to as "secondary storage" or "disks" 16), which in the present case comprises M hard disk drives (where M is also an integer).

As is typical, computing device 20 may include a display 21 and multiple input peripherals, such as a keyboard 22 and mouse 24, as well as hardware to network with other computers (not shown). The database system 10 may be loaded with instructions for executing methods exemplary of this invention from a computer program product 26 having a computer readable medium, which could be an optical or magnetic disk, tape, or chip for example. Alternatively, the instructions for executing methods exemplary of this invention can be saved on a suitable storage medium such as a diskette, a CD, a hard drive, or like devices.

Figure 2:
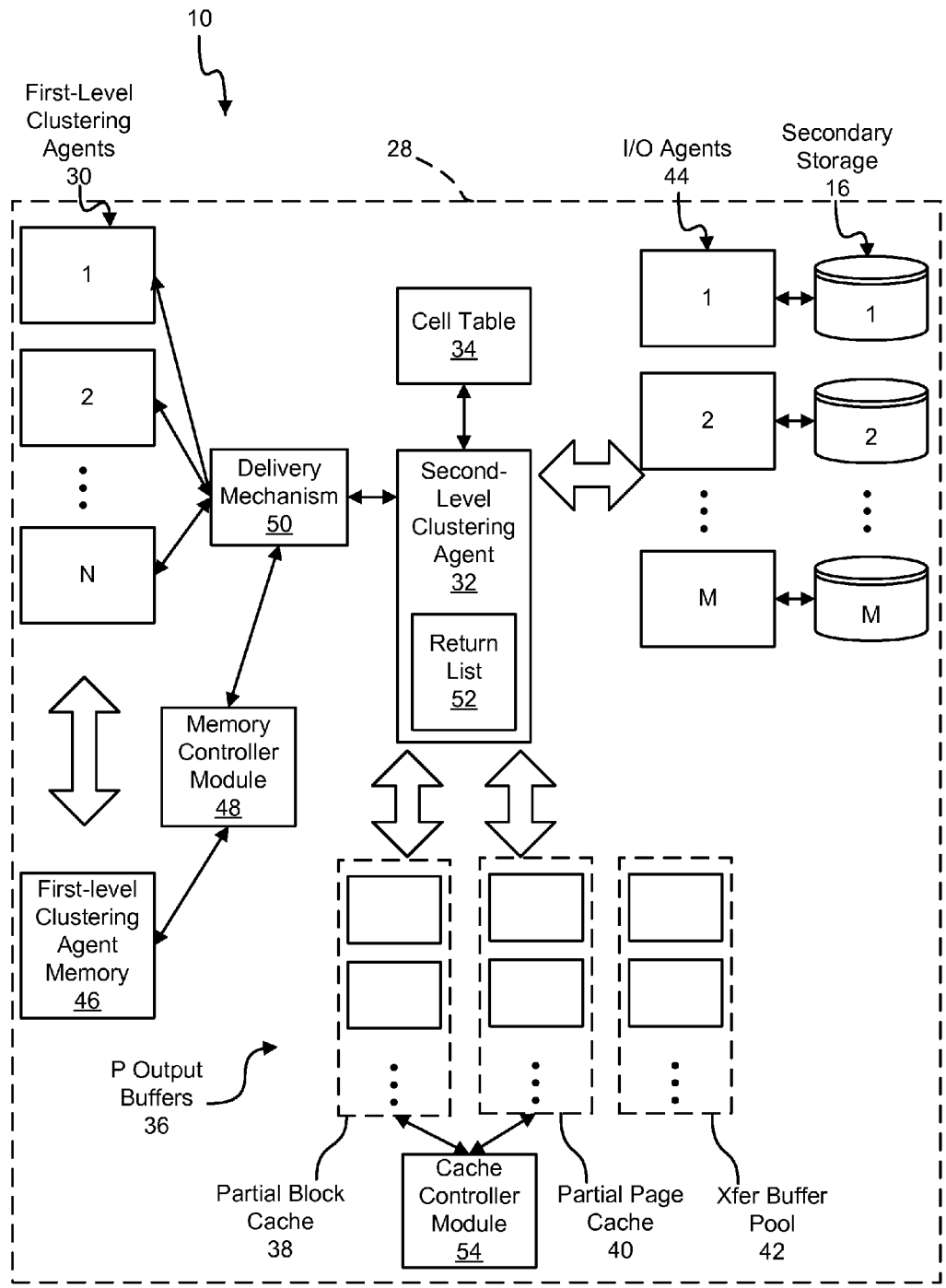
FIG. 2 is a schematic block diagram illustrating one embodiment of components of the system of FIG. 1 in greater detail.

FIG. 2 is a schematic diagram illustrating software components, data structures and hardware components of one embodiment of the database system 10 in greater detail. The database system 10 includes a load utility 28. The software components and data structures of the load utility 28 comprise the following components: N first-level clustering agents 30 (where N is the number of processors 12 in computing device 20); a second-level clustering agent 32; a set of P output buffers 36 (where P is an integer) comprising a partial block cache 38, a partial page cache 40, and a transfer buffer pool 42; a cell table 34; and M input/output (I/O) agents 44 (where M is the number of hard disk drives).

The N first-level clustering agents 30 are processes that perform a first level of processing of input data to be loaded into an MDC or partitioned table of the database system 10. Each of the N first-level clustering agents 30 processes a different subset of input data in parallel with the other N−1 agents.

The second-level clustering agent 32 is a process that performs a second level of input data processing using the output of the N first-level clustering agents 30.

The P output buffers 36 are areas of volatile memory that are used for the purpose of assembling blocks for storage to secondary storage 16. Each of the P output buffers 36 is capable of storing a single block of a multi-dimensionally clustering (MDC) table or partitioned tables. The P output buffers 36 are apportioned between a partial block cache 38, a partial page cache 40 and a transfer buffer pool 42, with the apportionment capable of change during system operation as described below.

Partial block cache 38 stores partially filled blocks as they are assembled during processing of the input data stream, with completely assembled blocks being sent to secondary storage 16.

Partial page cache 40 stores the last partially filled page for partially filled blocks which are spilled to secondary storage 16 from the partial block cache 38 in order to make room for new blocks associated with new cells encountered in the input data stream. Each buffer in partial page cache 40 is capable of storing multiple "last partial pages", with each partial page corresponding to a different cell.

The transfer buffer pool 42 is a set of buffers used to transfer data from the second-level clustering agent 32 to the M I/O agents 44. The buffers of the transfer buffer pool 42 circulate between the second-level clustering agent 32 and the M I/O agents 44 as they are filled with data by the second-level clustering agent 32, read by the I/O agents 44 for writing to secondary storage 16, and "returned" to the second-level clustering agent 32 for re-use (i.e. for refilling with new data).

The blocks being written to secondary storage 16 using the transfer buffers of transfer buffer pool 42 may be fully assembled blocks that are being stored or partially assembled blocks that are being spilled.

The cell table 34 is a searchable and updateable table maintained by the second-level clustering agent 32 during its processing of input data. The cell table 34 is maintained in volatile memory 14, although portions of the table may be spilled if necessary to a secondary storage device such as secondary storage 16, e.g. to make room for new pages in memory. Cell table 34 includes information regarding MDC cells or table partitions that have been detected in the input data thus far. Cell table 34 stores the following information for each detected cell: A pointer (or more generally, a reference) to the buffer in the partial block cache 38 corresponding to this cell (in cases when nothing exists in the partial block cache 38 for the cell, this pointer is NULL). A pointer (or more generally, a reference) to the last partial page for the cell in the partial page cache 40 or NULL if there is no entry in the partial page cache 40 for the cell. The number of the page (relative to the block) of the last partially filled page for the cell. For example, if a block can contain 32 pages, the last partially filled page for the block (before the block was victimized from the partial block cache 38) may have been page 12. The position within the last partially filled page where data was last added. For example, if a page is 4K (i.e., 4096 bytes in size), the last row of data added to the page may end at byte 2033. The ID of the I/O agent 44 to which the previous partially filled block for this cell was sent (this information being maintained so that CONTINUATION requests, i.e. requests to write to secondary storage 16 at a particular location, and MERGE requests, i.e. read requests for a partial block followed by a request to write the partial block with data appended thereto, may be sent to the same I/O agent 44).

Cell table 34 may be implemented as a temporary table with an index that is used for searching the table based on dimension key, for example.

The I/O agents 44 are processes that perform I/O to the M disks comprising secondary storage 16. Each I/O agent 44 is free to write to any of the M disks 16. The number of I/O agents 44 is configured to be M to exploit the disk parallelism that can be achieved with M disks.

In overview, a sliding window is defined over input data to be loaded into a MDC table or partitioned tables. The window size is dependent upon the amount of memory allocated to the first-level clustering agents: the more memory that is available, the larger the window is and the greater the amount of data clustering that may be performed.

The first-level clustering agents 30 assemble a subset of the input data into record lists for later processing by the second-level clustering agent 32. The record lists are stored in first-level clustering agent memory 46. Increasing the record list lengths by utilizing additional memory 46 will improve the performance of the MDC LOAD algorithm only if the first-level clustering agents 30 are relatively faster than the second-level clustering agent 32—i.e. the second-level clustering agent 32 cannot process the input record lists any faster than the first-level clustering agents 30 can produce them. Otherwise decreasing the overall work performed by the second-level clustering agent 32 will not reduce the overall execution time.

Since the output of the first-level clustering agents 30 is used as the input to the second-level clustering agents 32, a memory controller module 48 detects whether the throughput of the latter is dominating the processing time—i.e. the second-level clustering agent 32 is the bottleneck. This is achieved by examining the state of a delivery mechanism 50

(such as an operating system queue) used to send the record lists from the first-level clustering agents 30 to the second-level clustering agent 32. If the state of the delivery mechanism 50 indicates that second-level clustering agents 32 are prepared to process more output records of the first-level clustering agents 30 than are available, the memory controller module 48 may allocate additional memory 46 available to the LOAD utility 28 and increase the record list lengths to improve overall performance. The available memory 46 will be limited either by the total memory available in the system, or by any rules and policies imposed by a database management system (DBMS).

For a given window position, the input data within the window is divided evenly into portions among N first-level clustering agents 30. The first-level data clustering agents 30 execute concurrently, with each agent clustering and ordering its data portion into a record list made up of a single list of rows having one or more "sub-lists". Each sub-list contains data belonging to a single cell.

In one embodiment, the first-level clustering agents 30 order data using a "hash and hint" mechanism to determine if any two records possibly contain the same cell value. Specifically, the first-level clustering agents 30 compare records for each new record that is inserted into the record-list, and also for each record extracted from the record-lists. The hash and hint mechanism provides an integer value which is more efficiently used in comparisons among records than a complete cell-key comparison.

When processing each record in the first-level clustering agent 30, if a record with the same cell-value already exists in the record-list, the new record is appended to that cluster of like-records. If this is the first record of a particular cell-value, rather than inserting the record at the end of the record-list, the first-level clustering agent 30 hashes the cell value against a hash-algorithm, then uses the integer value returned (hereinafter known as the 'hint-key') to determine the order of insertion of the record into the record-list. The order of the records in the record-list may be arbitrarily chosen to be from smallest to largest integer value. Alternatively, the order of the records in the record-list may be chosen to be from largest to smallest integer value.

Based on the order used, the first-level clustering agent 30 inserts the record in order according to the determined hint-key. The hint-key is also added to the meta-information accompanying each record. Since each of the N first-level clustering agents is using the same hash-algorithm, the order of clusters-of-like-records amongst all record-lists is now deterministically ordered between each of the N first-level clustering agents 30.

Note that with any hash algorithm there is some probability that two different cell-values will hash to the same value (also known as a 'collision'). Since collisions result in extra comparison work by the second-level clustering agent 32, a hashing algorithm that will provide a uniform distribution across a large range of values is desirable, thus minimizing the probability of collision. In one embodiment, the first-level clustering agent 30 may employ an internal hashing algorithm which will return a value of any arbitrary size. For example, the hint-key may be 3 byte value (representing 16777215 distinct values). Since the number of unique cell values in a data set will rarely (if ever) approach this very large value, this algorithm may be deemed sufficient to minimize the probability of hash-collisions.

When a first-level clustering agent 30 is finished clustering and ordering its portion of data from the current input window, it provides its list to the single second-level clustering agent 32. The second-level clustering agent 32 collects lists from each of the first-level clustering agents 30 and then, processing multiple record-lists simultaneously, attempts to cluster the data in all of the N lists into blocks that can be written out to secondary storage 16. The second-level clustering agent 32 uses the output buffers 36 for this purpose.

In one embodiment, the second-level clustering agent 32 processes multiple record lists by waiting for multiple record-lists to arrive, determining how long to wait before processing the lists, and polling every list sequentially and using the records' hint-key to determine if any two records possibly contain the same cell-key.

When receiving record lists from N first-level clustering agents 30 the second-level clustering agent 32, in one embodiment, uses the following algorithm to decide how long to wait for more record-lists: first, wait indefinitely until the first record-list arrives, then after receiving a record-list from one of N first-level clustering agents, poll the message-queue N−1 more times. If more record-lists arrive during this time they are added to the group of record-lists awaiting processing, otherwise process the group of record-lists that have already arrived.

Since each list is now ordered by hint-key (as a result of the processing in the N first-level clustering agents 30), the second-level clustering agent 32, in one embodiment, starts with N record-lists and an empty return list 52, the return list 52 is configured to receive records clustered by the second-level clustering agent 32. The second-level clustering agent 32 then compares the hint-keys of the first record of each of the N record-lists and selects the first record with the lowest hint-key (or highest if the ordering is reversed). The second-level clustering agent 32 then removes the selected record along with any records with the same hint-key as the hint-key of the selected first record on the same record-list, adding the removed records to the return list 52. Next, the second-level clustering agent 32 compares the hint-keys of the first records of each of the N record-lists to the hint-key of the removed records. In one embodiment, the N record-lists used in the comparison would not include the record list from which records have just been removed. If any first records have the same hint-key, they are removed along with clustered records (those with the same hint-key) on the same record-list as the first records, and appended to the return list 52. If no first records have the same hint-key as the removed records, the second-level clustering agent 32 processes the return list 52.

In another embodiment, the second-level clustering agent 32 also compares the cell-key values of records having equivalent hint-keys. If the cell-keys are not equivalent, a collision has occurred as described above, and the records are not combined into the same return list 52. In response to a collision, the second-level clustering agent 32 may return to the record lists and determine if a first record of another record list has the same hint-key and repeat the process, leaving the colliding records for later processing. In a different embodiment, the first-level clustering agent 30 orders the record-lists from highest to lowest value, and the second level clustering agent 32 selects the first record with the highest hint key.

The return list 52, in one embodiment, is processed by clustering the one or more records of the one or more record lists ordered by the hint-key. The output of the return list is stored in the P output buffers 36. Originally all P output buffers 36 are allocated as transfer buffers of transfer buffer pool 42, and the partial block cache 38 and partial page cache 40 are empty (i.e. have no buffers).

In one embodiment, when a new cell is encountered in the output from the return list 52, the second-level clustering agent 32 acquires a buffer from the transfer buffer pool 42 to begin assembling a first block for that cell. If there is enough input data to fully assemble one or more blocks, the blocks are spilled to secondary storage 16. If a partially filled block remains, the buffer is allocated to the partial block cache 38. Allocation of partial blocks to the partial block cache 38 may be repeated until a maximum number Y of buffers has been allocated to the partial block cache 38, where Y is an integer less than P. The value of Y is preferably chosen such that the transfer buffer pool 42 is left with at least one buffer per I/O agent 44 (i.e., leaving at least M output buffers 36) to promote I/O parallelism of the M I/O agents 44.

When the maximum number of buffers (Y) has already been allocated to the partial block cache 38, victimization of a partial block from the partial block cache 38 becomes necessary for storing a partial block associated with a new cell encountered in the output from the return list 52. Consequently, the second-level clustering agent 32 victimizes a partial block from the partial block cache 38 and stores its last partially filled page in any available buffer of the partial page cache 40. It will be appreciated that the term 'buffer replacement' or the term 'partial block replacement' may be used instead of 'victimization.'

The last partial page is stored so that, if the output from the return list 52 contains further data belonging in the cell corresponding to the spilled partial block, data may continue to be filled in without first reading the entire spilled block back into memory from secondary storage 16. If the partial page cache 40 has insufficient space to store this page (e.g., when the partial page cache 40 has not yet been allocated any buffers), a further buffer is reassigned from the partial block cache 38 to the partial page cache 40. The partial block stored therein is then spilled to secondary storage 16. This reassigned buffer is used to store the last partial pages of the victimized buffers' blocks, with the remaining space of that reassigned block being left empty for future storage of partial pages of other blocks that may be spilled. The freed space of the partial block cache 38 is then used to store the new partial block.

Reassignment of buffers from the partial block cache 38 to the partial page cache 40 is permitted because storage of partial pages is important in limiting costly I/O operations associated with the reading back of partial blocks previously spilled to secondary storage 16.

When spilling a partially filled block or storing a fully assembled block to secondary storage 16, the second-level clustering agent 32 assigns the block to the transfer buffer pool 42 and marks it as being in need of writing to secondary storage 16 by one of the group of M asynchronous I/O agents 44. For efficiency, each of the I/O agents 44 preferably writes to its dedicated disk in parallel with the other I/O agents 44.

Upon the filling of an output buffer in the partial page cache 40 with last partial pages of spilled blocks, a further buffer may be reassigned from the partial block cache 38 to the partial page cache 40 for storing additional partial pages. However, the number of buffers in the partial block cache 38 is not permitted to fall below a threshold number T (where T is an integer less than or equal to Y). The purpose of maintaining a minimum threshold number of buffers in the partial block cache 38 is to facilitate the assembly of at least T blocks (of T different cells) at any given time. This may be especially important when the input data is not well clustered, to avoid the need to frequently swap partial blocks out of and back into the partial block cache 38.

If the number of blocks in the partial block cache 38 drops to the threshold number T, the number of buffers in the partial block cache 38, partial page cache 40, and transfer buffer pool 42 may then remain fixed at T, Y-T and P-Y buffers respectively for the duration of processing (this being referred to as the "steady-state condition").

In some scenarios, the benefits of reduced I/O do not outweigh the added computational overhead incurred in the second-level processing agent 32. Hence, in one embodiment the partial block cache 38 and partial page cache 40 may be dynamically enabled and disabled by a cache controller module 54. The LOAD utility 28 may start with a disabled cache 38, 40, which is optimal if the input data are ordered along the clustering columns (note that the input source consisting of a single unit of clustering is a subset of the ordered case). This is because an ordered data source results in different units of clustering being processed sequentially—i.e. the second-level processing agent 32 never receives data for a new unit of clustering until all data for the current unit of clustering has been processed. Hence caching partial blocks or partial pages for later use yields no benefit.

The second-level processing agent 32 may query the cell table 34 every time a record list for a different unit of clustering is received. The cell table 34 information may be used to determine whether any record lists for that unit of clustering were already processed. If so, the input source is not ordered, in which case the partial cache 38, 40 is enabled by the cache controller module 54. Such conditional enabling of the partial cache 38, 40 benefits the overall performance when loading well clustered data, since both memory and CPU cycles needed to maintain the cache are now being utilized to perform other tasks and thus improve the overall system throughput. For example, memory not used for caches 38, 40 may be used for increasing the first-level clustering agent memory 46.

In one embodiment, cache 38, 40 may be dynamically disabled. An input/output ratio representing a measure of the performance benefit attributed to the partial block cache 38 and the partial page cache 40 may be tracked to determine the effectiveness of the cache for a given input data stream and/or return list 52. The cache 38, 40 may be disabled by the cache controller module 54 in response to the input/output ratio dropping below a predefined value.

The input/output ratio may be a calculated value in one embodiment. For example, in order to measure the improvement in the I/O characteristics due to partial block cache 38 and partial page cache 40, the following values may be tracked while the LOAD utility 28 is running: Nr–number of regular requests, Nc–number of continuation requests, Nm–number of merge requests Pr–total number of pages written via regular requests, Pc–total number of pages written via continuation requests, Pm–total number of pages written via merge requests. Hence the total I/O is simply the total number of written pages: Pr+Pc+Pm.

In this example, the estimate of the I/O overhead incurred, both read and write, to cluster data on disk is the sum of 1) approximate ½ page overhead per request due to the fact that the atomic unit of I/O is a page, and 2) the single page read needed to perform the merge request: ½*(Nr+Nc+Nm)+Nm. The input/output ratio is then: ½×(Nr+Nc+3×Nm)/(Pr+Pc+Pm). In the worst case scenario (short record lists, insufficient caching) the P values and N values are the same (i.e. the LOAD utility 28 never writes more than a page at a time), there are no continue requests (these require a hit in the partial page cache) and the number of regular requests is much smaller (there is at least one regular request for each block—the first one) than the number of merge requests. Hence the limiting case of the above ratio is 3/2. One single tunable parameter is the threshold value of the I/O ratio.

Any value may be selected as a predefined value for disabling the cache 38, 40. A couple of interesting values for the input/output ratio are: worst case=1.5. Average sublists translates to about a page of records, 32 page extent, no PPC=1.47. Average sublists translates to about a page of records, 32 page extent, some PPC=1.02. Average sublists translates to about a page of records, 32 page extent, efficient PPC=0.50. Average sublists translates to about 5 pages of records, 32 page extent, no PPC=0.30. Average sublists translates to about 5 pages of records, 32 page extent, efficient PPC=0.11. Given these values, one set of reasonable (intuitive) threshold values would be 0.75/0.5. These values indicate that it is acceptable to give up caching that doesn't reduce the I/O overhead by at least 50%/33%.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
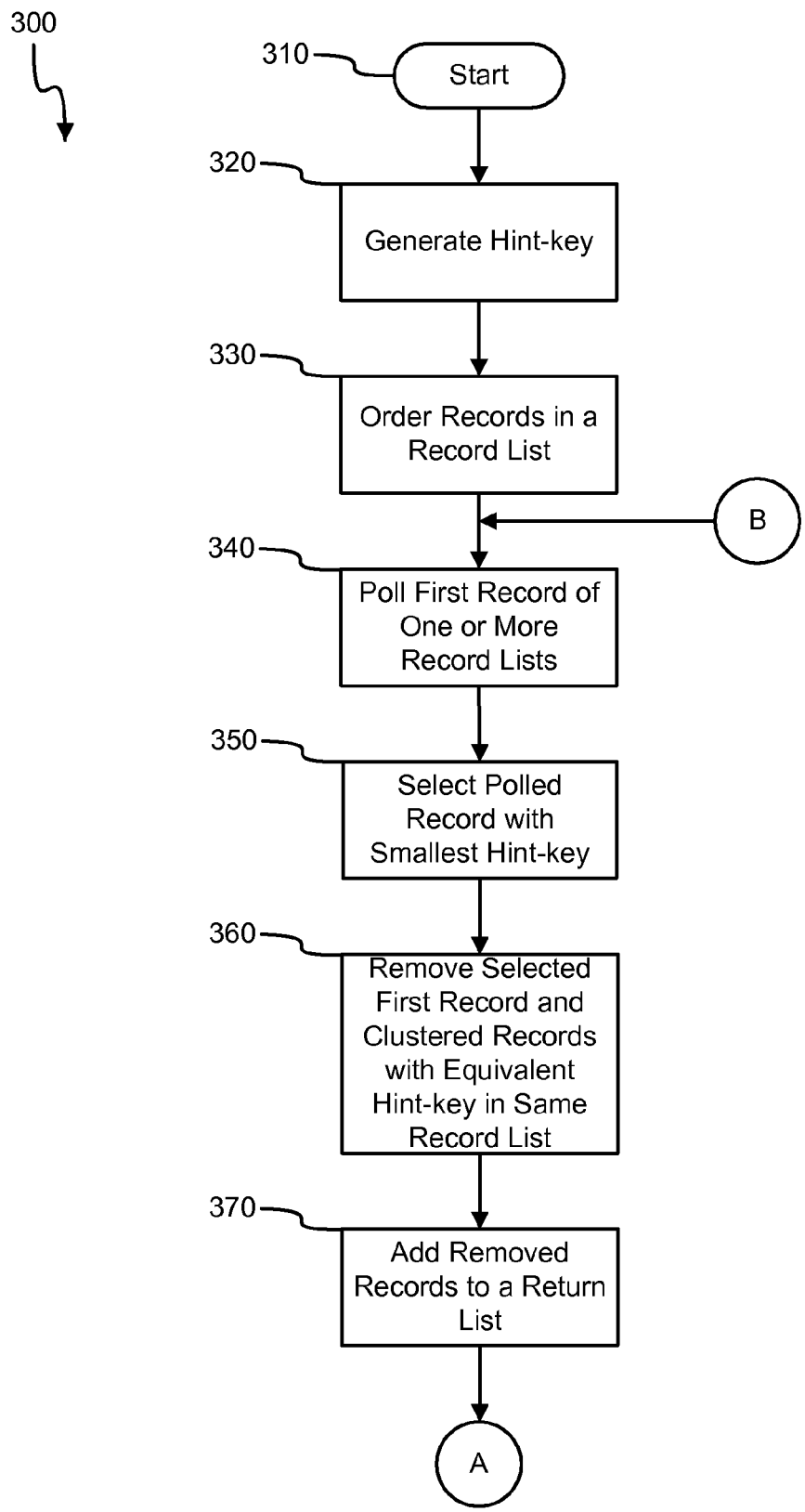
FIG. 3 is a schematic flow chart diagram illustrating one embodiment of a method for processing input data in accordance with the present invention.
Figure 4:
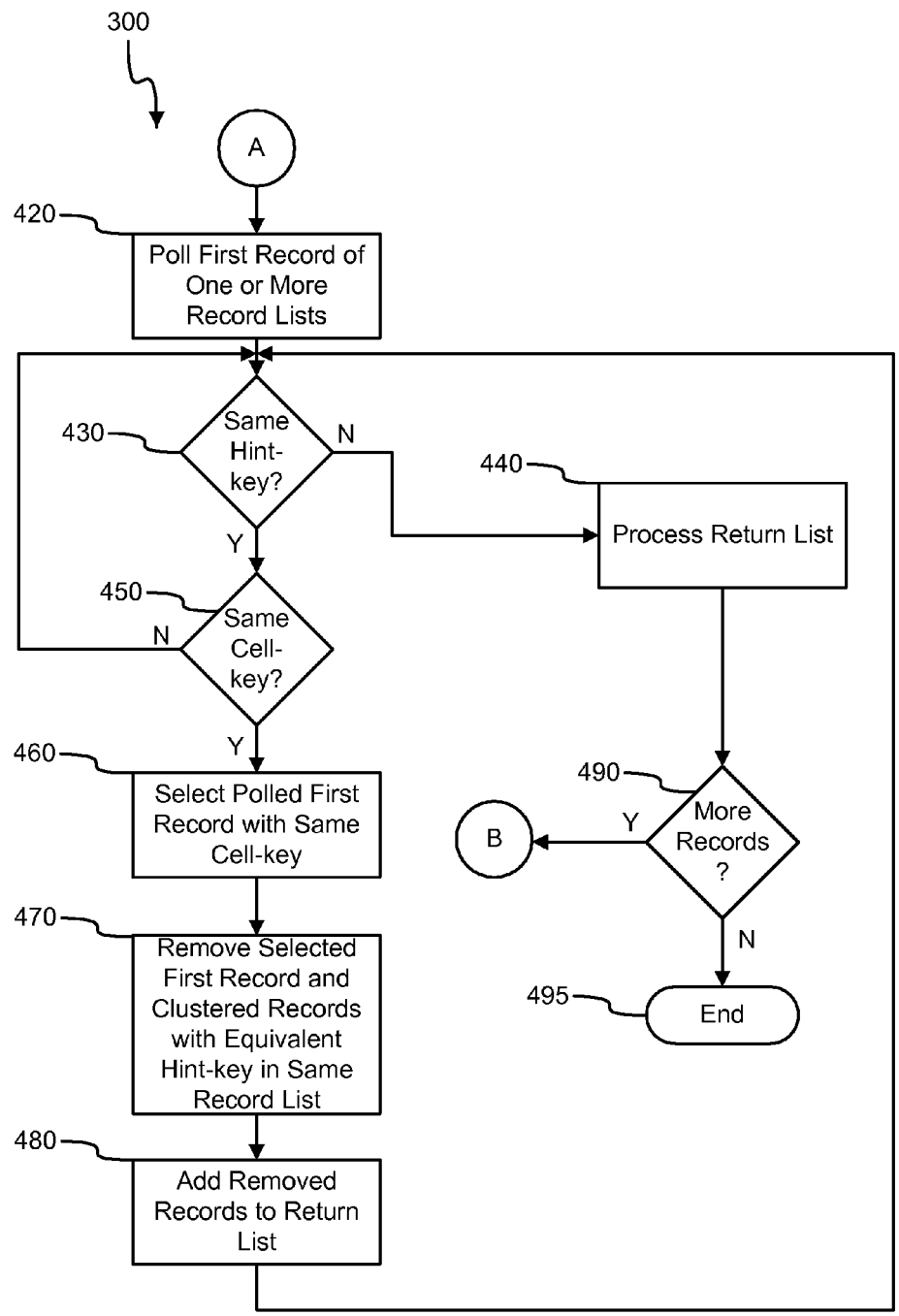
FIG. 4 is a schematic flow chart diagram illustrating one embodiment of a method for processing input data in accordance with the present invention.

Operation of the present embodiment is illustrated in FIG. 3 and FIG. 4. FIG. 3 and FIG. 4 are a flow chart diagram showing the various steps of a method 300 for efficient adaptive parallel data clustering for loading data into a table. The method 300 is, in certain embodiments, a method of use of the system and apparatus of FIGS. 1-2, and will be discussed with reference to those Figures. Nevertheless, the method 300 may also be conducted independently thereof and is not intended to be limited specifically to the particular embodiments discussed above with respect to those Figures.

As shown in FIG. 3, the method 300 starts 310 and a first-level clustering agent 30 (of FIG. 2) generates 320 a hint-key for a record. The hint-key may be a calculated value generated from a cell-value of the record. In one embodiment, the hint-key may be an integer hash value. The hint-key may be added to the meta data of the record for later access. In one embodiment, the first-level clustering agent 30 generates 320 hint-keys for a subset of the entirety of the records being loaded into the table.

Next, the first-level clustering agent 30 orders 330 a subset of the entirety of the records being loaded into the table, the records ordered 330 by hint-key in a record list. The records may be ordered 330 from lowest hint-key to highest hint-key. In an alternative embodiment, the records may be ordered 330 from highest hint-key to lowest hint-key. In yet another typically less efficient embodiment, the records may be ordered 330 by cell-value.

As the records are ordered 330, records with the same hint-keys and cell-values are clustered together. The resulting ordered 330 record lists are, therefore, clustered and ordered subsets of the entirety of the records being loaded into the table.

Next, a second-level clustering agent 32 (of FIG. 2) polls 340 the first record of one or more record lists, the record lists ordered 330 by the first-level clustering agents 30. Polling 340 the first records may comprise accessing a field in the first records to retrieve a stored hint-key. The data extracted by polling 340 the first records may be stored in cache memory for later use.

Next, the second-level clustering agent 32 compares the hint-keys polled 340 in the preceding step and selects 350 the polled 340 record with the smallest hint-key if the record lists are ordered 330 from lowest value hint-key to highest value hint-key. In an alternate embodiment, the second-level clustering agent 32 may select 350 the polled 340 record with the highest hint-key if the record lists are ordered 330 from highest value hint-key to lowest value hint-key. If there are multiple record lists with first records having the same lowest or highest hint-key, the second-level clustering agent 32 may arbitrarily select 350 among the first records having the same hint-key.

Next the second-level clustering agent 32 removes 360 the selected 350 first record along with any clustered records having an equivalent hint-key from the same record list. Upon the removal 360 of the first record and any clustered records on the same record list, either that record list becomes empty, or a new record with a different hint-key (the next record in the ordered list) becomes the first record of the record list.

Next the removed 360 records are added 370 to a return list 52 (of FIG. 2) by the second-level clustering agent 32. The return list 52 contains records having equivalent hint-keys or cell-values. In one embodiment, the return list 52 is empty before the removed 360 records are added 370.

The method 300 then proceeds to A in FIG. 4.

As shown in FIG. 4, the method 300 continues with the second-level clustering agent 32 polling 420 the first record of one or more record lists. Preferably, the polling 420 checks the other record lists besides the one that provided the removed 360 records. However, due to the dynamic nature of the method 300, the same record list that provided the removed 360 records may also be polled 420 in certain embodiments.

The polling 420 is based on the hint-keys for these first records. In one embodiment, the second-level clustering agent 32 may poll 420 all of the record lists. In an alternate embodiment, the second-level clustering agent 32 may poll 420 the first records by accessing previously cached data from the record lists previously polled 340.

Next, the second-level clustering agent 32 compares the polled 420 hint-keys with the hint-key of the removed 360 first record(s) and determines 430 if any remaining first records have the same hint-key. A determination 430 that no remaining first records have hint-keys that are equivalent to the hint-key of the removed 360 first record is an indication that no other records currently in the record lists being processed by the method 300 should be clustered with the records in the return list 52. Since no records remain in the record lists to be clustered with the records in the return list 52, the second-level clustering agent 32 processes 440 the return list. Processing 440 the return list 52 comprises emptying the return list 52 in preparation to receive a new cluster of data and transferring the clustered data from the return list 52 to the partial block cache 38 (of FIG. 2). In one embodiment, processing 440 the return list 52 may comprise outputting a plurality of partial blocks to the partial block cache 38.

A determination 430 that one or more remaining first records have hint-keys equivalent to the hint-key of the removed 360 first record is an indication that the polled 420 first records may be clustered with the records in the return list 52.

Next, the second-level clustering agent 32 may compare the cell-value of a polled 420 first record having the same hint-key to the cell-value of the removed 360 first record in the return list 52 and determines 450 if the records have the same cell-value. A determination 450 that the records with equivalent hint-keys do not have the same cell-value is an indication of a collision, and that the polled 420 record determined 430 to have an equivalent hint-key should not be clustered with the removed 360 records. As a result, the second-level clustering agent 32 removes the colliding records from the group of polled 420 first records and returns to determine 430 if any other polled 420 first records have the same hint-key as the removed 360 records.

A determination 440 that the first record has a cell-value equivalent to the cell-value of the removed 360 first record is an indication that the polled 420 first record may be clustered with the records in the return list 52. As a result, the second-level clustering agent selects 460 the polled 420 first record with the same cell key as the removed 360 first record.

Next, the second-level clustering agent 32 removes 470 the selected 460 first record along with any clustered records having an equivalent hint-key from the same record list. Upon the removal 470 of the first record and any clustered records on the same record list, either the record list becomes empty, or a new record with a different hint-key becomes the first record of the record list.

Next the removed 470 records are added 480 to the return list 52 by the second-level clustering agent 32. The return list 52 contains records having equivalent hint-keys or cell-values. The second-level clustering agent 32 then returns to determine 430 if any other polled 420 first records have the same hint-key as the removed 360 records.

Upon determining 430, 450 that no records remain in the record lists to be clustered with the records in the return list 52, the second-level clustering agent 32 processes 440 the return list 52. The return list 52 is processed 440 by outputting the records in the return list 52 as a plurality of partial blocks to the partial block cache 38 and emptying the return list 52 in preparation to receive a new cluster of data.

After processing 440 the return list 52, the second-level clustering agent 32 determines 490 if there are any records remaining in the record lists. A determination 490 that records remain in the record lists results in the second-level clustering agent 32 returning to poll 340 the remaining first records of the record lists for further processing. A determination 490 that no records remain in the record lists is an indication that the second-level clustering agent 32 has completed clustering of the record lists, and the method 300 ends 495.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium having computer usable program code executed by at least one processor for loading an input data stream into a data structure containing data that is clustered along one or more dimensions, the operations of the computer program product when executing the computer usable program code comprising:

generating a hint-key for each of one or more records in the input data stream, wherein the hint-key is a hash value generated using a cell value of each of the one or more records, the cell value comprising a dimension by which the records are to be clustered;

ordering the one or more records in a first-level clustering agent to generate one or more record lists ordered by the hint-key of the one or more records;

processing one or more record lists in a second-level clustering agent, the second level-clustering agent configured to:

process the one or more record lists simultaneously;
wherein processing the one or more record lists simultaneously comprises:
polling the first record of each of the one or more record lists;
selecting the polled first record with the smallest hint-key;
removing the selected first record and each record with an equivalent hint-key clustered with the selected first record on the same record list;
adding the removed records to a return list;
polling again the first record of each of the one or more record lists;
comparing the hint-key of the again polled first records to the hint-key of the removed records;
processing the return list in response to no polled first records having an equivalent hint-key to the hint-key of the removed records, processing the return list comprising outputting a plurality of partial blocks to a partial block cache;
comparing a cell-key of a polled first record to a cell-key of the removed records in response to the hint-key of the polled first record being equivalent to the hint-key of the removed records;
selecting the polled first record in response to the cell-key of the polled first record being equivalent to the cell-key of the removed records;
removing the selected first record and each record with an equivalent hint-key clustered with the selected first record on the same record list; and
adding the removed records to the return list;
output the one or more records of the one or more record lists clustered by the hint-key of the one or more records;

storing, in the partial block cache, the plurality of partial blocks that are output by the second-level clustering agent, wherein each partial block is associated with a distinct logical cell; and storing, in a partial page cache, a plurality of last partial pages of the partial blocks that have been victimized from the partial block cache.

2. A system to load an input data stream into a data structure containing data that is clustered along one or more dimensions, the system comprising:

one or more microprocessors;
volatile memory;
non-volatile memory; and
a database management system (DBMS) comprising:
a hint-key module configured to generate a hint-key for each of one or more records in the input data stream, wherein the hint-key is a hash value generated using a cell value of each of the one or more records, the cell value comprising a dimension by which the records are to be clustered;
a first-level clustering agent module configured to order the one or more records to generate one or more record lists ordered by the hint-key of the one or more records;
a second-level clustering agent module configured to process one or more record lists, the second-level clustering agent module configured to:

process one or more record lists simultaneously; and output the one or more records of the one or more record lists clustered by the hint-key of the one or more records;

a partial block cache module configured to store a plurality of partial blocks that are output by the second-level clustering agent, wherein each partial block is associated with a distinct logical cell; and a partial page cache module configured to store a plurality of last partial pages of the partial blocks that have been victimized from the partial block cache; and a cache controller module configured to dynamically enable the partial block cache module and the partial page cache module in response to a determination that the input data stream is not ordered, and dynamically disable the partial block cache module and the partial page cache module in response to an input/output ratio being below a predefined value; the input/output ratio comprising a calculated value measuring the performance benefit attributed to the partial block cache module and the partial page cache module.

3. The system of claim 2, wherein the DBMS further comprises a memory controller module configured to:

determine a state of a delivery mechanism used to deliver the record lists to the second-level clustering agent module;

increase the memory allocated to the first-level clustering agent module for the storage of record lists in response to the state of the delivery mechanism indicating a surplus of record lists; and decrease the memory allocated to the first-level clustering agent module for the storage of record lists in response to the state of the delivery mechanism indicating a shortage of record lists.

* * * * *